United States Patent [19]
Velthoven

[11] 3,731,795
[45] May 8, 1973

[54] NUT GAUGING MACHINE
[75] Inventor: Arthur E. Velthoven, Warren, Mich.
[73] Assignee: Federal Screw Works, Detroit, Mich.
[22] Filed: Mar. 16, 1972
[21] Appl. No.: 235,207

[52] U.S. Cl. ..................209/73, 209/80, 209/82, 209/109
[51] Int. Cl. ..............................B07c 5/06
[58] Field of Search...............209/73, 74, 90, 80, 209/82, 109

[56] References Cited

UNITED STATES PATENTS

| | | | |
|---|---|---|---|
| 1,771,097 | 7/1930 | Raule | 209/82 |
| 2,111,252 | 3/1938 | Summers | 209/82 |
| 3,613,882 | 10/1971 | Stampe | 209/90 |
| 3,539,006 | 11/1970 | Hanna | 209/80 |

Primary Examiner—Allen N. Knowles
Attorney—J. King Harness et al.

[57] ABSTRACT

A machine for gauging lock nuts of the type in which the nut body is squeezed to distort a portion of the thread thereof. Adequately squeezed nuts are segregated from nuts which have either been squeezed insufficiently or not squeezed at all. A rotating carriage on the machine has probes on which the nuts are deposited. The nuts are discharged from the carriage through one of two unloading stations, depending upon whether or not the probes have been able to pass through the holes of the nuts.

10 Claims, 6 Drawing Figures

Patented May 8, 1973

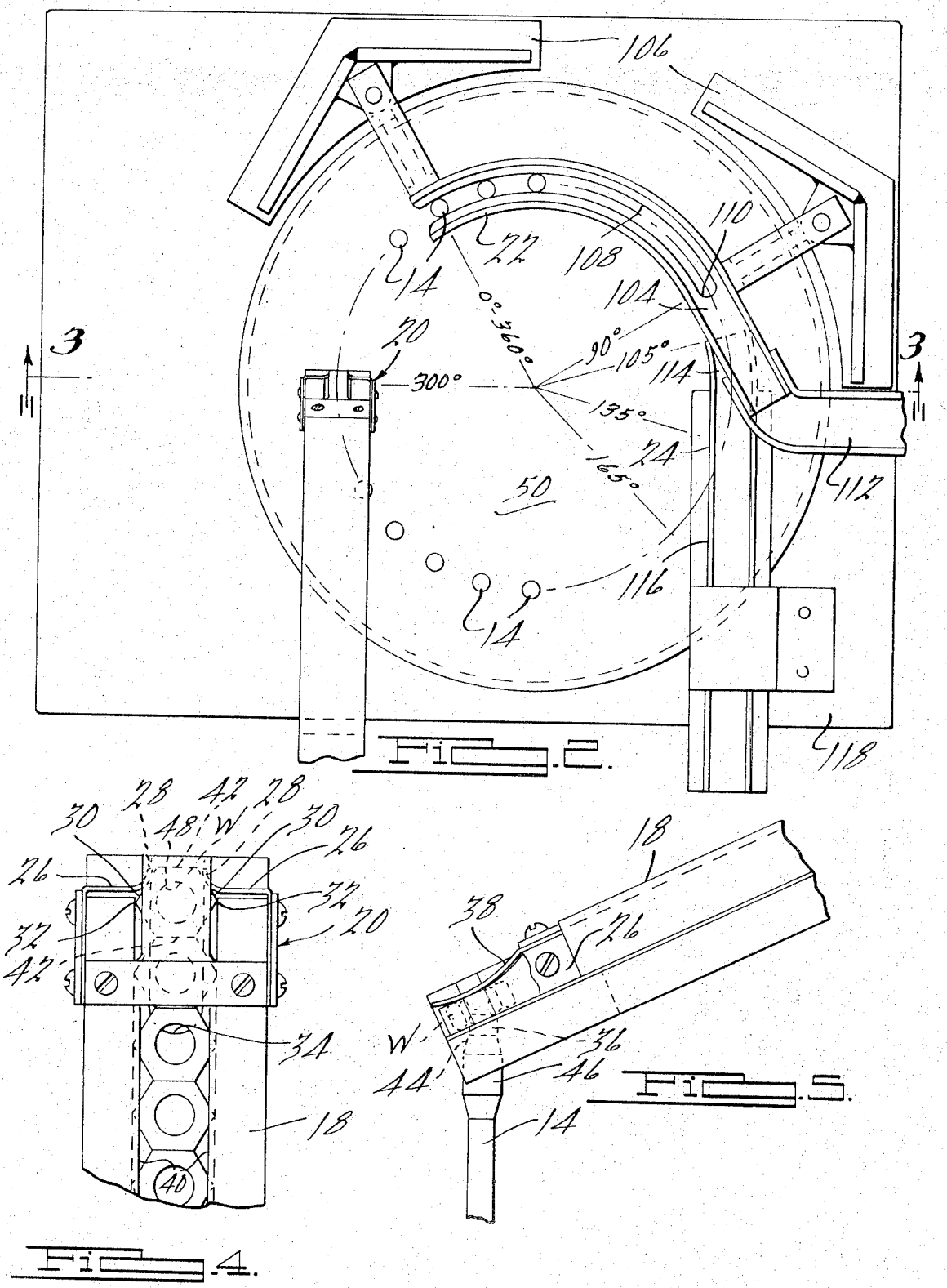

NUT GAUGING MACHINE

SUMMARY OF THE INVENTION

The manufacture of prevailing torque lock nuts frequently involves the squeezing or indenting of standard nut blanks to distort a portion of the threaded nut hole. The squeezed or indented portion of the thread will grip the bolt or other male threaded fastener to provide the desired locking action. It has been found desirable to provide means for insuring that all of the nuts in a given lot have been properly squeezed. This need has arisen as the result of accidental co-mingling of unsqueezed and squeezed nuts and also the improper adjustment of the nut squeezing or indenting apparatus as a result of which nut blanks have been either oversqueezed or insufficiently squeezed. Whether a nut has been indented or squeezed sufficiently can be detected by inserting into the nut hole a gauging probe having a diameter corresponding to the maximum allowable hole width. If the nut is able to pass over the gauging diameter of the probe this may be taken as evidence that the nut has been insufficiently squeezed. Similarly, probes may be used to sort out oversqueezed nuts. According to the present invention the nuts to be gauged are deposited on probes in a high speed rotary machine. Depending upon whether the nuts are able to drop by gravity over a gauging portion of the probe or are prevented from passing over the gauging portion of the probe, they are either rejected or not rejected.

It is an object of the present invention to provide a nut gauging machine which will reliably segregate insufficiently squeezed, unsqueezed or oversqueezed nuts from properly squeezed nuts.

It is another object of the present invention to provide a machine of the above character which may be manufactured at a low cost, which has a high rate of operation, which is highly convenient to use, which may be conveniently altered to gauge nuts of different size and which requires a minimum of human attention for its proper functioning.

While the machine of the present invention can be used to sort out oversqueezed nuts, it will be described initially as being used for segregating unsqueezed or undersqueezed nuts.

DESCRIPTION OF THE DRAWINGS OF THE PREFERRED EMBODIMENT

FIG. 2 is an enlarged plan view of a portion of the structure illustrated in FIG. 1;

Figures 1, 6:
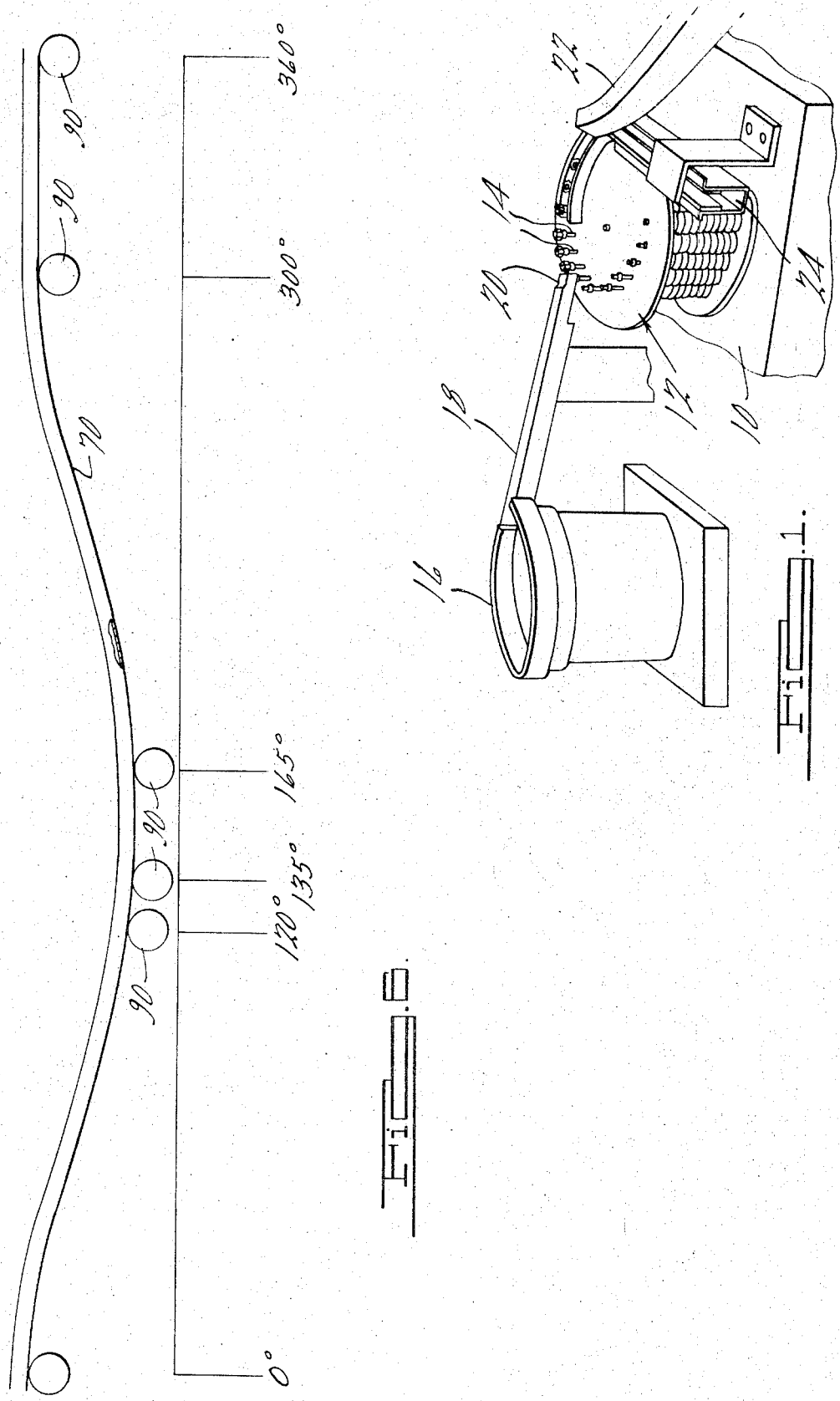
FIG. 1 is a perspective view of a machine constructed in accordance with the present invention.
Figure 3:
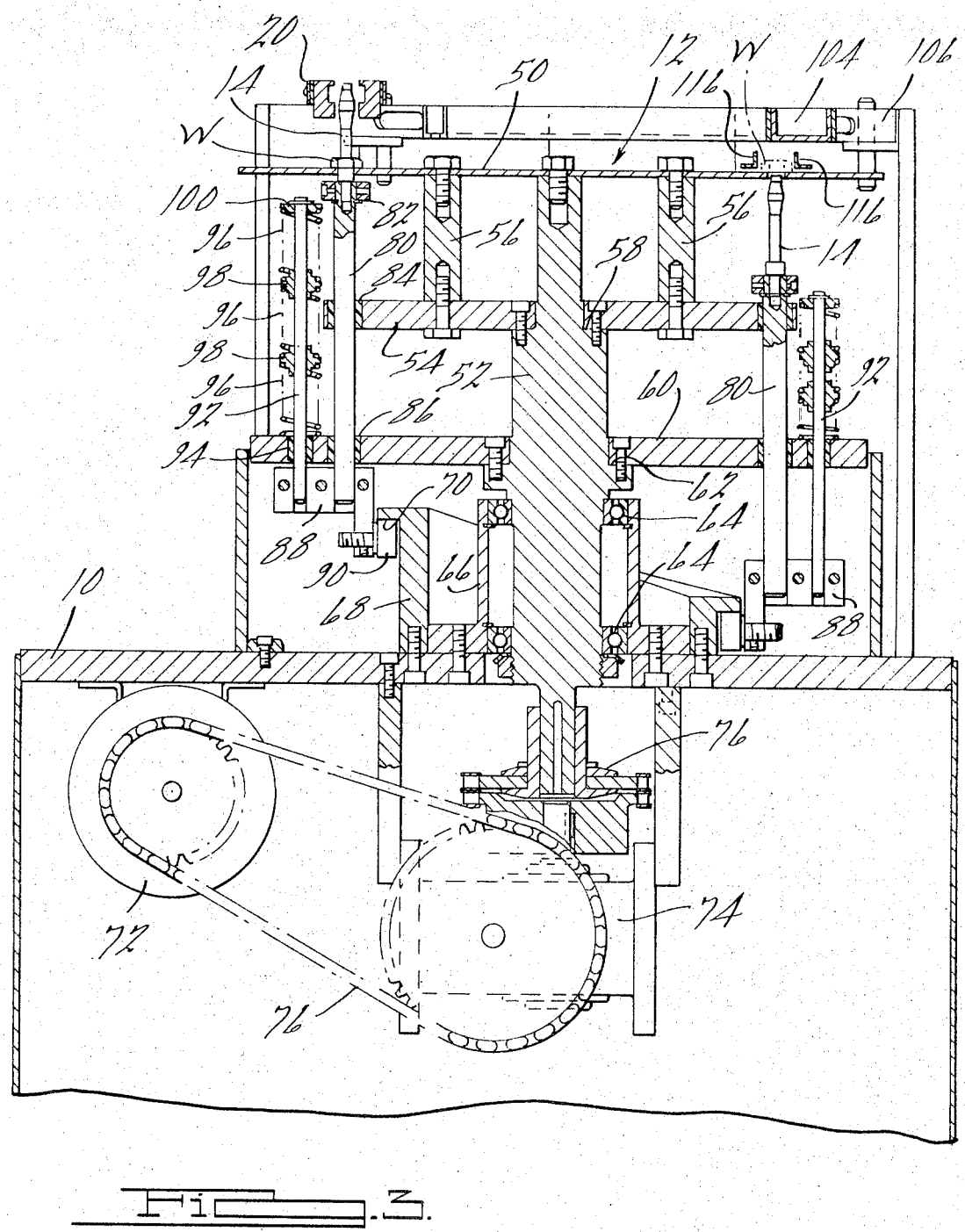

FIG. 3 is a sectional view of the structure illustrated in FIG. 2 taken along the line 3—3 thereof; and FIGS. 4 and 5 are enlarged plan and side elevational views of a portion of the structure illustrated in FIGS. 1 and 2.

FIG. 6 illustrates a develop-ment of the cam surface.

DESCRIPTION OF THE PREFERRED EMBODIMENT OF THE INVENTION

FIG. 1 illustrates a stand 10 on which a carrier 12 is mounted for rotation. The carrier 12 carries a plurality of nut gauging probes 14. Nuts are fed from a vibratory parts feeder 16 down an inclined chute 18 having a nut delivery or loading station 20 at the lower end thereof. Nuts are extracted from the delivery station 22 by the probes 14 as they pass therethrough. Properly squeezed nuts are removed from the carrier 12 through a first discharge of unloading station 22. Unsqueezed nuts or insufficiently squeezed nuts are removed from the carrier 12 through a second unloading or discharge station 24.

It will be seen that the chute 18 is downwardly inclined from the parts feeder 16 to the carrier 12. Accordingly, the nuts slide down the chute under the influence of gravity. The chute 18 will be seen to have a pair of spaced parallel side walls 40 which confine the nuts W therebetween. The spacing between the side walls 40 is just slightly greater than the diametral distance between the opposite corners 32 of the nut W. This assures that the nuts W will advance down the track 18 oriented with a pair of opposite side walls 42 on the forward and rear side thereof disposed perpendicular to the direction of travel. Thus, a side wall 42 of one nut W will abut an adjacent side wall 42 of the next succeeding or preceding nut in the chute 18. The delivery station 20 comprises the lower end portion of the chute 18, the construction of station 20 being best seen in FIGS. 4 and 5. An hexagonal walled nut in the delivery station 20 (as well as all other nuts to be gauged) is identified by the letter W. Fastened to the chute 18 so as to hold a nut W for extraction from the delivery station 20 are a pair of springs 26. The springs 26 have curved end portions 28 which engage a pair of spaced side walls 30 on the forward side of the nut W. It will be apparent that the spacing between the springs 26 is less than the distance between a pair of opposite corners 32 of the nut 30. The delivery station 20 positions each nut W with the threaded hole 48 thereof in alignment with the probes 14 as they pass through the delivery station. The inclination of the chute 18 orients the nut W in the station 20 so that an upper end portion 36 of each probe will contact said nut at the forward and lower end of its threaded hole 48. The inclination of the chute 18 permits the probe portion 36 to pass under the rear side of the nut in order to enter the nut hole 48. The bottom of the chute 18 is formed with a slot 34 which permits the probe portion 36 to clear the chute 18 as it advances through the station 20. When a probe 14 engages a nut W in the station 20 it pulls the nut through the springs 26 with the nut side walls 30 wedging the springs 26 apart. This permits the next succeeding nut W to drop into engagement with the springs 26. It should be noted that as a nut W in the delivery station is pulled through the springs 26, it is held down on the probe portion 36 by an upper spring 38 which bears on the top of the nut.

If a nut W has been properly squeezed, it will rest on its probe 14 in engagement with a tapered surface 44 thereof. The tapered surface 44 leads from the portion 36 to an enlarged diameter probe portion 46. The diameter of the portion 46 represents the minimum acceptable diameter for the squeezed portion of the nut hole 48. If the nut hole 48 is greater than the diameter of the probe portion 46, the nut will drop down past the probe portion 46 onto a plate 50 (FIGS. 2 and 3). The plate 50 is circular in shape and is screwed to the top end of the drive shaft 52. It is also supported on an intermediate guide plate 54 through supporting rods 56. The intermediate supporting plate 54 is screwed to a shoulder 58 of the drive shaft 52. A lower guide plate 60 is bolted to a shoulder 62 of the drive shaft 52 in a location spaced beneath the guide plate 54. The plates 50, 54 and 60 are parallel to one another and perpendicular to the axis of rotation of the drive shaft 52. The drive shaft 52 is supported for rotation on the stand 10 through bearings 64 contained within a bearing housing 66. The bearing housing 66 is bolted to the stand as is a circular cam member 68 having a serrated cam surface 70. The cam surface 70 is spiral in shape and faces in a downward direction. Rotation of the drive shaft 52 is produced by a motor 72 through a transmission 74 and chain 76. The transmission 74 is coupled to the drive shaft 52 through a clutch assembly 78.

The probes 14 are equally in a circular path which is centered with the axis of rotation of the drive shaft 52. The probes 14 are parallel to one another as well as being parallel to the axis of the drive shaft 52. Each probe 14 is fastened to the upper end of a guide rod 80 by a clamp 82. Each rod 80 is coaxial with its paired probe 14 and has a smooth outer cylindrical surface which provides for its longitudinal reciprocation within plane bearings 82 and 84 carried in the guide plates 54 and 60, respectively. Each guide rod 80 is fastened at its lower end to a cam follower block 88. Each cam follower block rotatably supports a cam follower roller 90 which rolls along the cam surface 70. Each follower block is also fastened to the lower end of a spring guide rod 92. The spring guide rods 92 are guided within plane bearings 94 positioned in the guide plate 60. Three springs 96 are stacked on the guide rods 92 and are connected by guide members 98 for compression between the guide plate 60 and a washer 100 carried at the upper end of each guide rod 92. Thus, the springs 96 bias the follower blocks 88 in an upward direction, maintaining the follower rollers 90 in engagement with the cam surface 70.

The plates 50, 54 and 60, the drive shaft 52 and the structure carried thereby all comprise portions of what has heretofore been designated as the carrier 12. Rotation of the carrier 12 about the axis of the drive shaft 52 will cause reciprocation of each probe 14 as determined by the path of the cam surface 70. When the roller 90 associated with a given probe 14 is disposed in engagement with the high point of the cam surface 70, that probe will be in the nut delivery station 20. When a given follower roller 90 is at the low point of the cam surface 70 its probe 14 will be generally in alignment with the entrance to the second nut unloading station 24 and that probe will be disposed beneath the upper surface of the plate 50.

The first unloading station 22 comprises a channel 104 supported by stands 106 at a level spaced above the plate 50. An elongated slot 108 is formed in the channel 104 to permit the movement of the probes 14 therethrough. By the time the probes reach the end 110 of the slot 108 they are positioned beneath the level of the channel 104. The channel 104 is generally arcuate in shape for the major portion of its length and communicates with a discharge chute 112 extending radially away from the carrier 12. It will be seen that the downstream end of the channel 104 and the loading station 20 are disposed approximately 180° apart. Disposed immediately beneath the downstream end of the channel 104 is an inlet end 114 of the second unloading station 24. The unloading station 24 comprises a pair of spaced apart upright side walls 116 positioned immediately above the plate 50 so as to confine and guide nuts resting on the plate 50. The channel defined by the plates 116 extend tangentially with respect to the path of movement of the probes 14. The space or channel between the side walls 116 is open to the plate 50 with the side walls 116 being suspended over the plate 50, cantilever fashion, from a bracket 118. A row of nuts W will accumulate between the side walls 116 from the probes 14. Each probe 14 will remain slightly above the wall 50 as it enters the unloading station 24 although each probe will have dropped beneath the upper level of the plate 50 by the time that it passes laterally out of alignment with the unloading station 24. Thus, the side walls 116 do not interfere with the probes 14.

The probes 14 provide the motive power for advancing the row of nuts W within both discharge stations 22 and 24. It will be seen that the discharge station 22 leads to a bin 120 which is separate from a "reject" bin 122 accepting nuts from the discharge station 24. If a nut W has been properly squeezed it will be held in an elevated position by its probe surface 44 so that it will enter the first discharge station 22 and enter the bin 120. If a nut W has not been adequately squeezed it will drop over the portions 44 and 46 of its probe 14. Such a "bad" nut will be carried beneath the discharge station 22 and enter the second discharge station 24, eventually ending up in the "reject" bin 122.

One feature of the present invention which has been found to facilitate a high speed operation of the device is the formation of the serrations in the cam surface 70. These serrations impart a vibration to the probes 14 which increases the rate at which the improperly squeezed nuts W will drop over the probe portions 44 and 46.

FIG. 6 illustrates a development of the cam surface 70. Various locations on the cam surface 70 are indicated in degrees, with these same locations being shown in FIG. 2. Accordingly, the probe height for any given point around the circle of movement of the probes 14 can be determined by comparing FIGS. 2 and 6. The 300° cam location aligns with the nut delivery station 20, the 360° or 0° cam location coincides with the inlet of the first discharge station 22 and the 105° cam location is beneath the inlet to the second nut discharge station 24. At the 90° point on the cam the probes 14 will have been drawn beneath the channel 104 of the station 22. By the time a probe reaches the 135° cam location it will have been drawn beneath the level of the plate 50, which is its low point. A probe 14 will not begin to rise again until it reaches the 165° cam location, by which time it will be clear of the discharge station 24. In moving from the 165° to the 300° cam locations, a probe moves from its lowest to its highest levels. At the 300° location a probe picks up a nut at the delivery station and does not begin to descend again until after it enters the discharge station 22. During this 60° of cam travel an unsqueezed nut will have fallen over its probe 14 onto the plate 50 and will enter the second discharge station 24, passing beneath the station 22.

While the machine of the present invention has been described for use in segregating unsqueezed or undersqueezed nuts, the machine is also usable for segregating excessively squeezed nuts. This alternative function simply involves the use of a different diameter probe portion 46 for a given size nut. In the first described usage the diameter of the probe portion 46 corresponds to the maximum allowable width of the nut hole 48. If the probe portion 48 is sized to correspond to the minimum allowable width of nut hole 48, then excessively squeezed nuts will be held on the upper probe portion 36 and will be discharged through the first unloading station 22. Nuts which have not been oversqueezed will be discharged through the unloading station 24. Thus the machine may be used alternatively to sort out either undersqueezed or oversqueezed nuts.

What is claimed is:

1. A machine for segregating nuts in accordance with the width of a hole extending therethrough, said machine including a carrier, drive means for said carrier, a plurality of nut hole probes mounted on said carrier for reciprocation, a cam, a plurality of cam followers connected one to each of said probes and operable to follow said cam when said carriage is driven to reciprocate said probes, a nut loading station from which nuts are deposited on said probes, first and second nut unloading stations arranged at different levels and operable to remove nuts in alignment therewith from said carrier as said nuts are moved thereby, each of said probes having a gauging portion operable either to hold a nut deposited thereon at the level of said first station or to permit the nut to drop therepast to the level of said second unloading station depending upon the width of the nut hole.

2. The machine set forth in claim 1 wherein said carrier is driven in rotation by said drive means.

3. The machine set forth in claim 1 wherein said probes are arranged in parallel vertical relation.

4. The machine set forth in claim 1 including means supporting said carrier for rotational movement by said drive means and in which said probes are arranged in a circular path centered about the axis of rotation of said carrier.

5. The machine set forth in claim 1 including a inclined nut loading chute having said loading station at its lower end and in which said loading chute is operable to position a nut therein in the path of movement of said probes and at an angle with respect to the path of movement of said probes whereby a probe passing through said loading station will engage a nut at said loading station in the hole thereof.

6. The machine set forth in claim 1 in which said cam is of endless construction and in which said cam followers move in an endless path around said cam.

7. The machine set forth in claim 1 in which the surface of said cam engaged by said cam followers is serrated to impart vibration to said cam followers.

8. The machine set forth in claim 1 in which said followers comprise rollers having spring means associated therewith operable to hold said rollers against a surface of said cam.

9. The machine set forth in claim 1 in which said first unloading station includes an arcuate channel member positioned in the path of movement of said probes, said channel member having a bottom wall provided with a slot operable to receive said probes and beneath the level of which said probes descend as said carrier is driven by said drive means.

10. A nut gauging machine for separating squeezed and unsqueezed nut blanks, said machine including a carrier, a support on which said carrier is journalled for rotation about a vertical axis, drive means for rotating said carrier about said axis, a plurality of gauging probes carried by said carrier and mounted for reciprocation thereon, said probes being arranged in a circular path centered about said axis, said probes being parallel to one another and being reciprocal in a vertical direction, an endless cam arranged concentrically about said axis, a plurality of cam followers connected one to each of said probes and operable to follow said cam as said carrier is rotated in order to reciprocate said probes, a nut loading station operable to hold a nut in an inclined position in the path of movement of said probes for deposit on a probe as it moves thereby, first and second nut unloading stations arranged in the path of movement of said probes but at different levels relative to one another, said unloading stations being operable to discharge the nuts delivered thereto by said probes, each of said probes having a gauging portion operable to hold an adequately squeezed nut at the level of said first station for delivery to said first station and being operable to permit an unsqueezed nut to drop therepast whereby an unsqueezed nut will pass beneath the level of said first unloading station and be delivered to said second unloading station.

* * * * *